United States Patent [19]

Henschen

[11] Patent Number: 5,411,287
[45] Date of Patent: * May 2, 1995

[54] MULTIPLE STAGE TORSION AXLE

[76] Inventor: Curtiss W. Henschen, 6144 State Rte. 29E, Sidney, Ohio 45365

[ * ] Notice: The portion of the term of this patent subsequent to Jan. 11, 2011 has been disclaimed.

[21] Appl. No.: 179,301

[22] Filed: Jan. 10, 1994

Related U.S. Application Data

[63] Continuation-in-part of Ser. No. 918,351, Jul. 7, 1992, Pat. No. 5,277,450.

[51] Int. Cl.⁶ ............................................... B60G 3/00
[52] U.S. Cl. ................................. 280/717; 301/127; 267/276
[58] Field of Search ................... 280/700, 717, 414.1, 280/679, 684; 301/124.1, 127, 137; 267/152, 154, 276

[56] References Cited

U.S. PATENT DOCUMENTS

| 1,964,735 | 7/1934 | Knox et al. | 267/280 |
| 2,352,586 | 6/1944 | Kilborn et al. | 267/280 |
| 3,687,479 | 8/1972 | Kober | 280/717 |
| 4,886,324 | 12/1989 | Turner | 267/276 X |
| 4,966,386 | 10/1990 | Werdich | 267/276 X |

FOREIGN PATENT DOCUMENTS

| 2582996 | 12/1986 | France | 280/700 |
| 2740890 | 3/1978 | Germany | 267/276 |

Primary Examiner—Russell D. Stormer
Attorney, Agent, or Firm—Jacox & Meckstroth

[57] ABSTRACT

A torsion axle for a vehicle includes an elongated axle tube enclosing first stage torsion shafts and second stage torsion shafts all having a common axis, and a metal tube or a non-circular portion of the axle tube and a plurality of resilient rubber rods confine each of the shafts for torsionally resisting rotation of the shaft. Each first stage metal tube is secured to the surrounding axle tube, and each second stage metal tube is connected to the corresponding first stage shaft. A stud projects outwardly from each second stage metal tube through a slot within the surrounding axle tube to limit rotation of the second stage tube with the first stage shaft, and a crank arm and eccentric spindle are secured to the outer end portion of each second stage shaft for receiving a wheel. In modifications, the first stage shafts for both the left and right wheels are connected as one shaft, and a hydraulic winch cable and spool provide for pre-rotating the one shaft or the axle tube to lower and raise the vehicle.

21 Claims, 3 Drawing Sheets

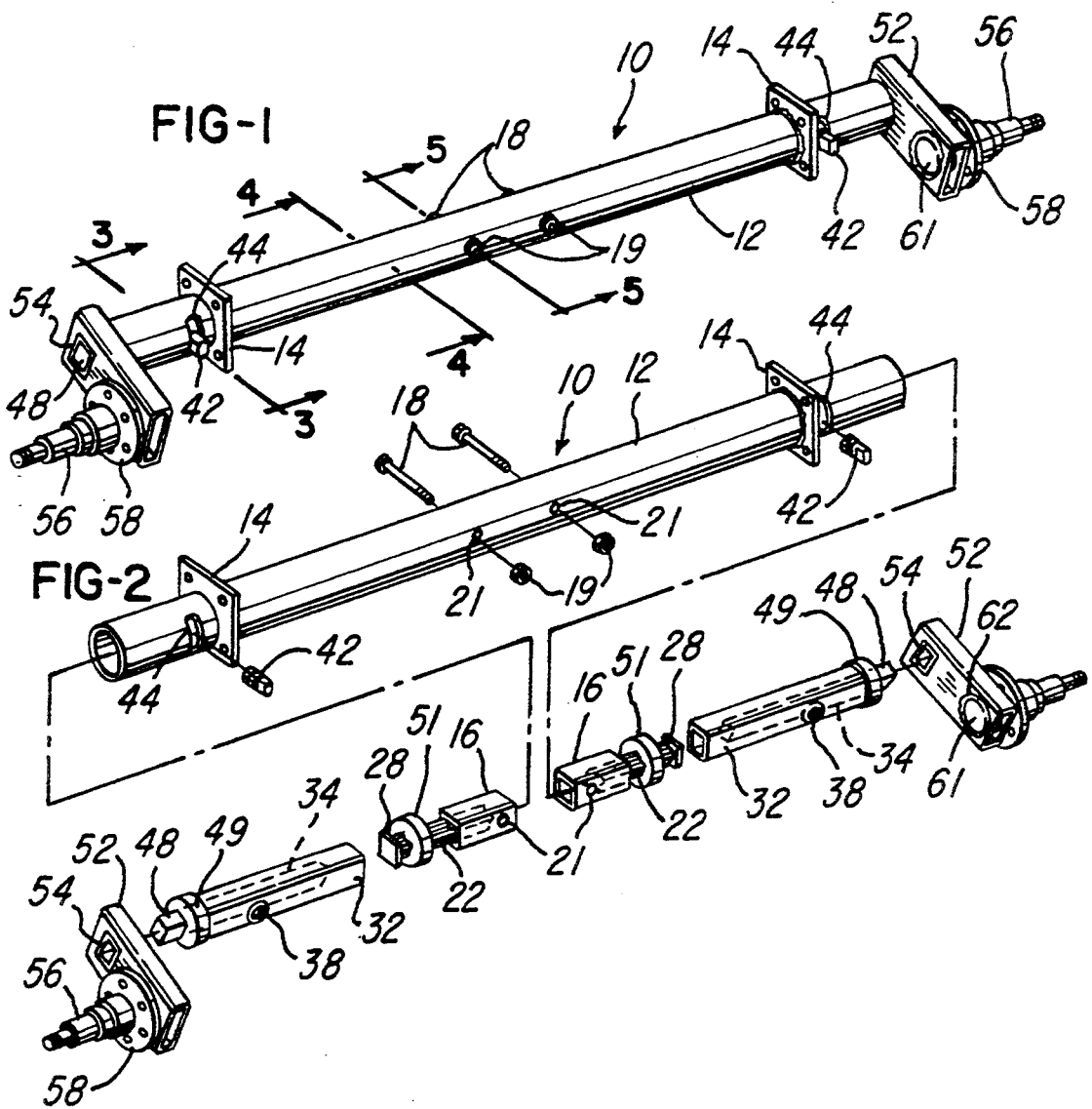
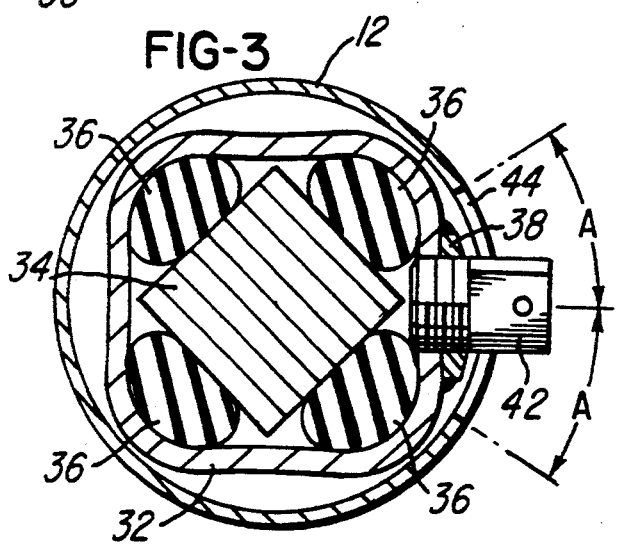
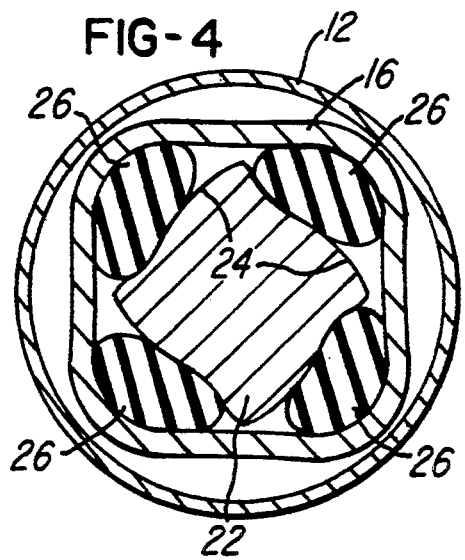

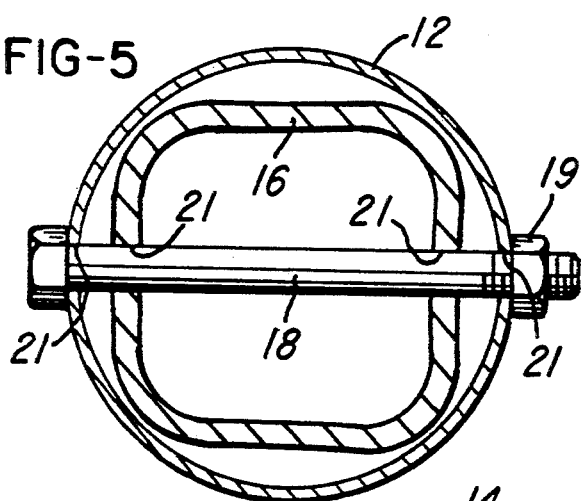
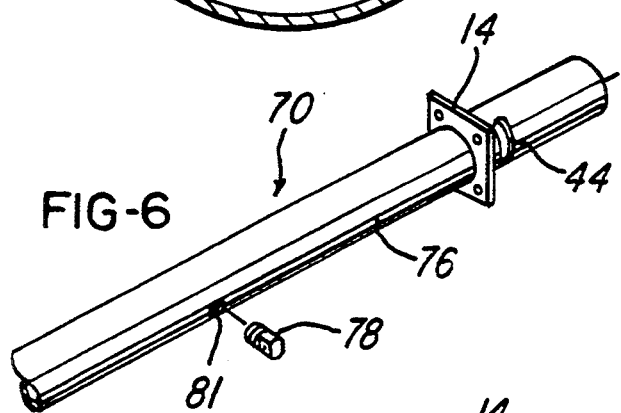
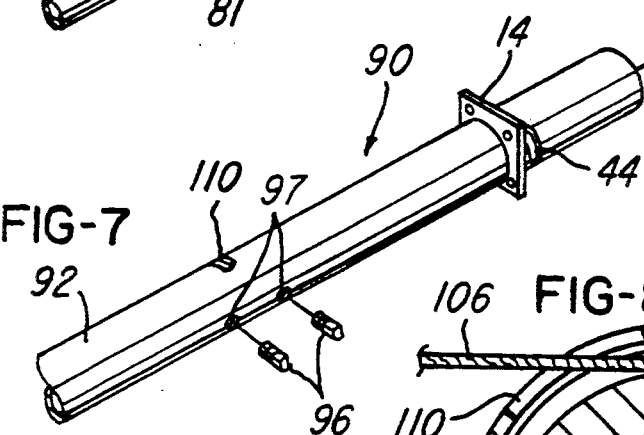
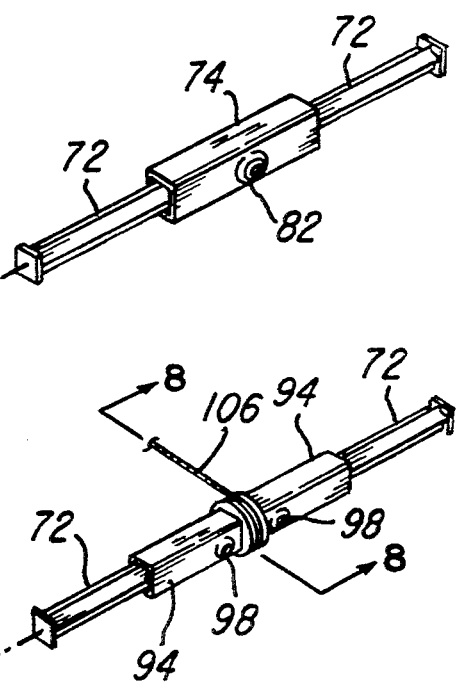
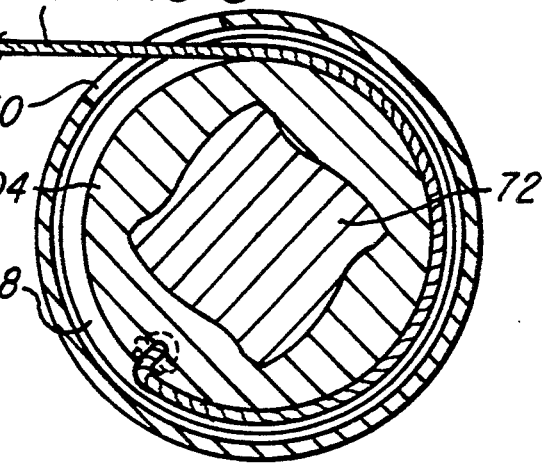
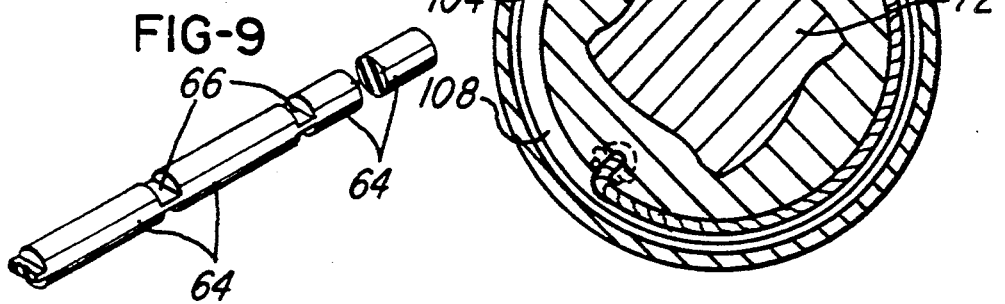

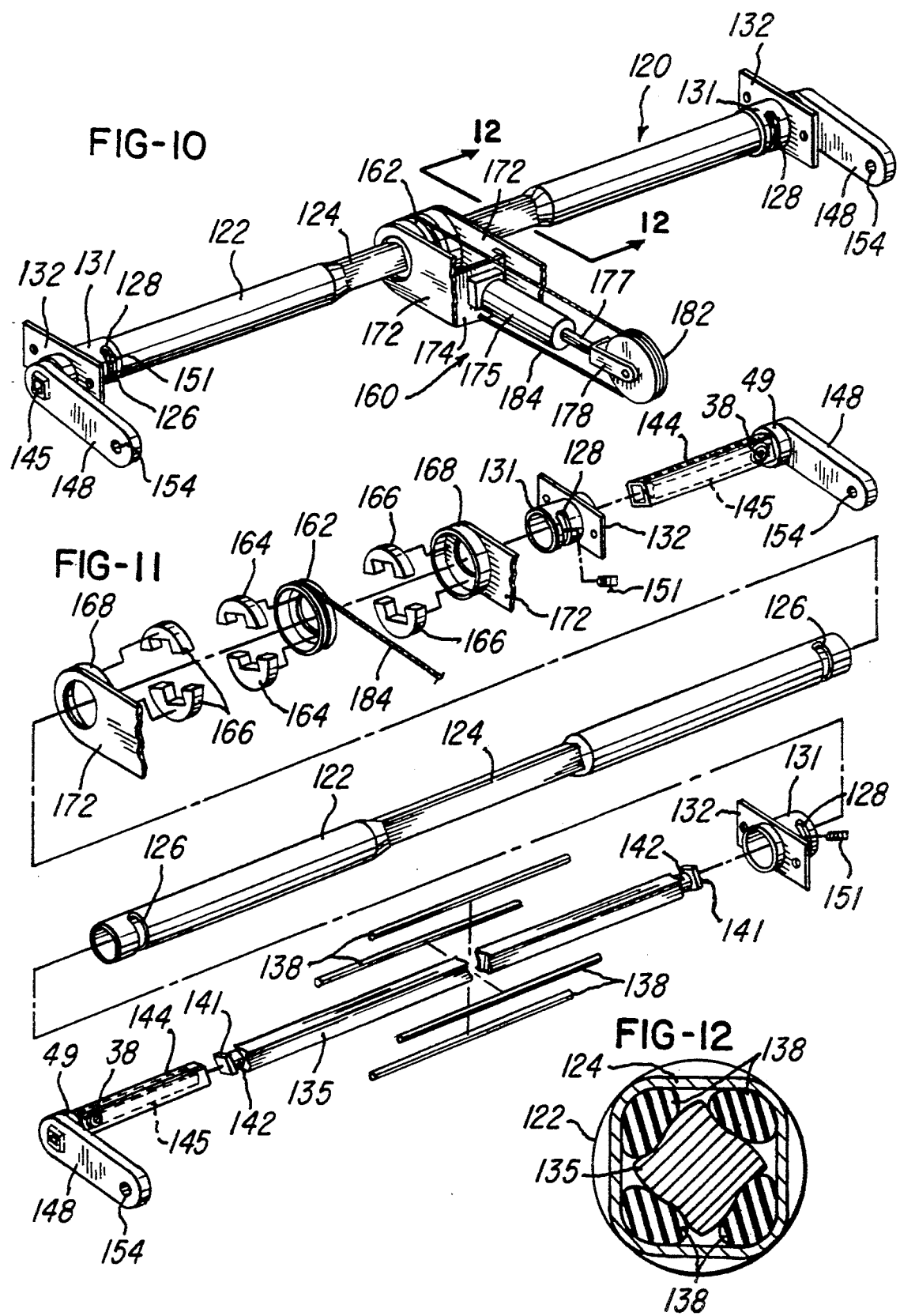

MULTIPLE STAGE TORSION AXLE

RELATED APPLICATION

This application is a continuation-in-part of application Ser. No. 07/918,351, filed Jul. 7, 1992, Pat. No. 5,277,450.

BACKGROUND OF THE INVENTION

In the art of rubber torsion axles of the general type disclosed in U.S. Pat. Nos. 3,208,168 and 3,436,069, which issued to applicant and are commonly used on trailers and other load carrying vehicles, it is frequently necessary for such vehicles to be transported along the road or highway while empty or at a static load and also be transported with a gross load which is substantially greater than the static load. For example, it is desirable to use such a torsion axle on a trailer with a static load of about two thousand pounds and having a gross load of about six thousand pounds without the trailer or vehicle bouncing or swaying under any loading condition. It is also desirable for the torsion axle to be simple, economical and dependable in construction, to be easily installed on a vehicle chassis, and to operate at the optimum position.

SUMMARY OF THE INVENTION

The present invention is directed to an improved torsion axle of the general type mentioned above and which provides multiple stages for use on a trailer or other vehicle adapted to transport a wide range of loads ranging from an empty or static load and a gross load several times that of the static load. The multiple stage torsion axle of the invention also provides the vehicle with a smooth ride under various loading conditions without bouncing and swaying of the vehicle. In addition the torsion axle of the invention is simple and economical in construction and provides for a dependable service life over an extended period of time.

The above features and advantages are provided in accordance with the invention by a torsion axle including an elongated cylindrical axle tube which mounts on the vehicle chassis and encloses a pair of first stage torsion shafts and a pair of second stage torsion shafts all in axial alignment. A generally square portion of the axle tube or a separate metal tube and a plurality of resilient or rubber rods confine each of the shafts for torsionally resisting rotation of the shaft, and each of the separate metal tubes for the first stage is connected to the axle tube. Each second stage metal tube is connected to the corresponding first stage shaft, and a crank arm and eccentric spindle are secured to the outer end portion of each of the second shafts for receiving a wheel. In modifications, the first stage shafts for both the left and right wheels are connected together as one shaft, and a hydraulic winch cable and spool are connected to the axle tube or to the one shaft to provide for pre-rotation of the axle tube or the one shaft to lower and raise the vehicle.

Other features and advantages of the invention will be apparent from the following description, the accompanying drawings and the appended claims.

BRIEF DESCRIPTION OF THE DRAWINGS

FIG. 1 is a perspective view of a multiple stage torsion axle constructed in accordance with the invention;

FIG. 2 is an exploded perspective view of the axle shown in FIG. 1 and showing the internal components;

FIG. 3 is a radial section taken generally on the line 3—3 of FIG. 1;

FIG. 4 is a radial section taken generally on the line of 4—4 of FIG. 1;

FIG. 5 is a radial section taken generally on the line of 5—5 of FIG. 1;

FIG. 6 is an exploded perspective view of a portion of a multiple stage torsion axle constructed in accordance with a modification of the invention;

FIG. 7 is an exploded perspective view similar to FIG. 6 and showing another modification of the invention;

FIG. 8 is an enlarged radial section taken generally on the line 8—8 of FIG. 7;

FIG. 9 is a fragmentary perspective view of a rubber rod molded in accordance with a modification of the invention.

FIG. 10 is a perspective view of a modified torsion axle constructed in accordance with the invention;

FIG. 11 is an exploded perspective view of the torsion axle shown in FIG. 10; and FIG. 12 is a section taken generally on the line 12—12 of FIG. 10.

DESCRIPTION OF THE PREFERRED EMBODIMENTS

FIG. 1 illustrates a multiple or two stage torsion axle 10 which includes an elongated steel axle tube 12 adapted to be mounted on a vehicle chassis by a pair of axially spaced square mounting flanges or plates 14 each having corner holes for receiving bolts which secure the plates and axle to the chassis. One of the plates 14 is welded to the tube 12, and the other plate 14 is free to slide from the tube so that the tube 12 may first be installed through aligned holes within the chassis.

A pair of generally square first stage metal tubes 16 (FIGS. 2, 4 & 5) are located within a center portion of the axle tube 12 and are each secured to the axle tube by a horizontal bolt 18 and nut 19 (FIG. 5) to prevent rotation and axial movement of each tube 16 relative to the surrounding axle tube 12. Each bolt 18 extends through aligned cross holes 21 within the tubes 12 and 16. A first stage torsion shaft 22 (FIGS. 2 & 4) extends through each of the tubes 16, and each shaft 22 has a generally square cross sectional configuration with each face formed by a slightly S-curved or involute surface 24, as also disclosed in above mentioned Pat. No. 3,436,069. A set of four resilient or rubber rods 26 also extend longitudinally within each tube 16 and are confined between the outer surfaces 24 of the shaft 22 and the opposing corner portions of the tube 16. As disclosed in the above-mentioned patents, the rubber rods 26 provide torsional resistance to rotation of each shaft 22 relative to the surrounding tubes 16 and 12, with the resistance progressively increasing as rotation of the shaft 22 continues.

A generally square plate 28 with rounded corners is welded to the outer end of each first stage torsion shaft 22 and projects into the opposing end portion of a second stage steel tube 32 having the same cross sectional configuration as the first stage tube 16. Each plate 28 provides for common rotation of each first stage shaft 22 with the corresponding second stage tube 32. A square second stage torsion shaft 34 extends axially within each of the tubes 32, and a set of four resilient or rubber rods 36 extend axially between the outer flat faces of the shaft 34 and the corresponding opposing corner portions of the tube 32, as shown in FIG. 3. The resilient or rubber rods 36 resist torsional rotation of each shaft 34 relative to the surrounding metal tube 32.

A nut 38 is welded to one side of each second stage tube 32 and is threaded along with the tube 32 for receiving the inner threaded end portion of a stud 42 having an outer end portion with opposite flats for receiving a wrench. Each of the studs 42 project outwardly from the corresponding tube 32 through an arcuate slot 44 within the axle tube 12. The slot 44 permits rotation of each tube 32 relative to the surrounding axle tube 12 by an angle A which is about 40 degrees in each direction from the normal or center position of the stud 42 within the slot, as shown in FIG. 3.

Each of the second stage shafts 34 has an outer end portion 48 which projects through a bushing or bearing 49 preferably formed of a low friction plastics material such as nylon and seats within the corresponding end portion of the axle tube 12. A similar bushing or bearing 51 is mounted on the outer end of each shaft 22 adjacent the corresponding connector plate 28 and precisely positions the inner end portion of the adjacent tube 32. A crank arm 52 is formed of tubular steel and includes a square tubular bushing or socket 54 which extends through the crank arm and has opposite ends welded to the crank arm. The socket 54 mates precisely with the end portion 48 of the second stage shaft 34 so that each crank arm 52 and the corresponding shaft 34 rotate together as a unit. Each crank arm 52 supports an eccentrically located spindle 56 having a flange 58 with circumferential spaced wheel holes, and each spindle 56 has an inner end portion 61 which extends through aligned holes within the crank arm 52 and is secured to the crank arm by an annular weld 62. Each crank arm 52 and the corresponding spindle 56 may also be formed as a one piece forging. Preferably, the hole within each bearing 51 is slightly off center or eccentric to provide the desired toe-in and camber for the corresponding axle 56.

The multiple stage axle 10 is assembled by first mounting the nylon bearings 51 on the shafts 22 and then inserting the torsion shafts 22 and 34 into their corresponding tubes 16 and 32 with the rubber rods 26 and 36 therebetween, as shown in FIGS. 3 and 4. The preferred method of inserting the rubber rods 26 and 36 is by first freezing the rods in a mold having the shape shown and until the rods become hard. The rods are then pressed into the tubes 16 and 32. The end plate 28 on each first stage shaft 22 is then inserted into the corresponding opposing second stage tube 32, and the nylon bearing 49 is mounted on the projecting end portion 48 of each shaft 34. Each set of assembled tubes 16 and 32 is then inserted into the corresponding end portion of the axle tube 12, and the studs 42 are inserted through the corresponding slots 44 and threaded into the corresponding nuts 38 for retaining each set of assembled tubes 16 and 32 within the surrounding axle tube 12. The cross bolts 18 are extended through the corresponding sets of aligned holes 21 within the tubes 12 and 16, as shown in FIG. 5, and the bolts 18 are secured by the nuts 19. The crank arms 52 are mounted or pressed onto the corresponding end portions 48 of the shafts 34 where the crank arms 52 are positively secured by suitable pins or cross bolts (not shown).

As shown in FIG. 9, each of the rubber rods 26 and 36 may be molded in axially spaced cylindrical sections 64 integrally connected by webs or tabs 66 located at the center of each section. The tabs 66 have a length of about ⅜", and the sections each have a length from about the same as the diameter of the sections 64 up to about three times the diameter of the sections 64. The rubber sections 64 are distorted to the shape shown in FIG. 3 or FIG. 4 within a mold prior to freezing, and the mold fills in the spaces on opposite sides of each tab 66 so that the sections do not distort axially prior to freezing.

The length of the first stage tubes 16 and the overall length of the corresponding rubber rods 26 or sections 64 are selected according to the normal weight of the vehicle and the corresponding static load on the axle 10, for example, the weight of an empty trailer. The torsional resistance on each crank arm 52 by the rubber rods 26 or sections 64 acting on the torsion shaft 22 provides the empty trailer or vehicle with a smooth ride without the problems of swaying and bouncing. As the vehicle or trailer is loaded towards its gross load, each of the second stage tubes 32 and corresponding shafts 34 rotate with the first stage shaft 22 until the corresponding stud 42 engages the end of the arcuate slot 44. The second stage tube 32 and corresponding first stage shaft 22 then stop rotating, and continued torsional resistance for each crank arm 52 is provided by the rubber rods 36 or sections 64 acting on the second stage shaft 34. The second stage torsional resistance for the crank arms 52 provides the loaded trailer or vehicle with a smooth ride without the problems of swaying and bouncing.

On some trailers or vehicles, it is desirable for the crank arms 52 to move together as a unit when the trailer or vehicle is transported empty or at its static load. Referring to FIG. 6, a multiple stage axle 70 is constructed the same as the axle 10 except that the first stage torsion shafts 72 are rigidly connected or formed as one single shaft. The one shaft extends through a first stage metal tube 74 having the same cross-section as the tubes 16 and enclosing a set or rubber rods 26. The tube 74 is secured to a surrounding axle tube 76 by a threaded stud 78 which is about the same as the stud 42 and extends through a hole 81 within the axle tube 76 and is threaded into a nut 82 secured to the center portion of the tube 74. Thus in this embodiment, the crank arms 52 pivot or rotate together during the first stage and provide common torsional resistance to the second stage tubes 32 and corresponding shafts 34 through an angle A in each direction of approximately 40 degrees. The second stage torsional resistance operates the same as described above in connection with the axle 10.

FIG. 7 illustrates another modification in accordance with the invention. In this modification, a multiple stage torsion axle 90 includes an axle tube 92 which includes a one piece first stage shaft 72 as described above in connection with FIG. 6. However, in the embodiment of FIG. 7, the first stage tube is formed in two axially spaced tube sections 94 each of which is secured to the surrounding axle tube 76 by a stud 96 extending through a corresponding hole 97 and threaded into a nut 98 welded to the tube 94. As shown in FIG. 8, a cable spool 104 is mounted on the center portion of the first stage shaft 72 and receives one end portion of a cable 106 which wraps within a groove 108 partially around the spool 104. The cable 106 extends through a slot 110 within the axle tube 92 and connects to a suitable winch (not shown) having a hand actuator or crank. The winch and cable 106 provide for pre-rotating the first stage shaft 72 against the bias of the first stage rubber rods 26 within the tube sections 94 so that the crank arms 52 rotate upwardly and the trailer or vehicle moves downwardly to provide for more convenient loading of the trailer or vehicle. A pre-rotation of the shaft 72 by an angle of 15 to 20 degrees provides for substantially lowering the empty trailer so that articles or objects to be transported may be more easily loaded onto the trailer or within the vehicle.

Referring to FIGS. 10–12 which show a modification of a multiple stage torsion axle constructed in accordance with the invention, a torsion axle 120 includes a steel axle tube 122 having a swaged center section or portion 124 with a square cross-sectional configuration. The tube section 124 functions the same as the first stage tube section 74 as described above in connection with FIG. 6. A slot 126 is formed within each end portion of the axle tube 122, and a mating slot 128 is formed within a corresponding cylindrical tube or bearing 131 which receives and supports the corresponding end portion of the axle tube 122 for relative rotation. Each of the bearings 131 is welded to a corresponding mounting plate 132 which is adapted to be secured to the chassis of the vehicle in the same manner as the plates 14 shown in FIGS. 1 and 2. In the axle 120, however, the axle tube 122 is supported for rotation by the bearings 131.

Referring to FIG. 11, a first stage torsion shaft 135 extends through the generally square center section or portion 124 of the axle tube 122, and the shaft 135 has generally a square cross-sectional configuration with curved outer surfaces, similar to the shaft 22 described above in connection with FIG. 4. A set of four rubber-like resilient rods 138 are formed the same as the rods 26 and are confined between the outer surfaces of the shaft 135 and the inner surfaces of the axle tube section or portion 124. Thus rotation of the first stage torsion shaft 135 relative to the axle tube 122 is resisted and controlled by the resilient rods 138, and a predetermined increasing torque is required to rotate the shaft 135 relative to the tube section 124 through a predetermined angle of rotation.

Square connector plates 141 and cylindrical spacers 142 are welded to opposite ends of the first stage torsion shaft 135 in the same manner as the plates 28 are welded to the ends of shafts 22 or 72, as described above in connection with FIGS. 2 and 6. Each of the plates 141 projects into the end portion of a square first stage torsion tube section 144 so that the tube sections 144 rotate with the first stage torsion shaft 135. A second stage torsion shaft 145 is confined within each of the second stage tube sections 144 by a set of four resilient rods 36, in the same manner as described above in connection with the support of each second stage torsion shaft 34 within the surrounding second stage tube section 32.

The outer end portion of each torsion shaft 144 is pressed into a mating hole within one end portion of a forged crank arm 148 and then swaged so that each of the crank arms 148 rotates with its corresponding torsion shaft 145. A plastic bushing 49 is mounted on each torsion shaft 145 adjacent the arm 148 and is rotably supported within the corresponding end portion of the axle tube 122. A threaded nut 38 is secured to the outer surface of each tube section 144 and receives a threaded stud 151 which projects through the corresponding aligned slots 126 and 128 to prevent axial movement of the tube section 144 within the axle tube 122 and to limit rotation of the tube section 144 within the axle tube 122 according to the length of the slot 126 or 128. The outer end portions of the crank arms 148 are provided with holes 154 for receiving corresponding wheel support spindles 56.

As mentioned above, the axle tube 122 may be rotated for rotating the crank arms 148 to lower and raise the vehicle and to position the crank arms 148 substantially horizontally during use of the vehicle for obtaining optimum performance of the torsion axle 120. The rotation of the axle tube 122 is performed by an actuating mechanism 160 including a cable drum or spool 162 (FIG. 11) which surrounds the center section 124 of the axle tube 122 and has an inner diameter large enough to slide over the axle tube 122. A pair of split mounting bushings 164 are confined within the spool 162 and are rigidly secured to the spool. The opposing bushing 164 define a square opening for receiving the tube section 124 and thus secure the spool 162 to the tube section 124 with the for rotation with the axle tube 122.

Two pairs of split bearing sections 166 are also secured to the tube section 124 and are formed of a rigid plastics material. The bearing sections 166 rotate within corresponding cylindrical bearings 168 which are welded to corresponding side plates 172 adapted to be secured to the chassis of the vehicle. A cross plate 174 is welded to the side plates 172 and supports the base portion of a hydraulic cylinder 175 which extends horizontally within the chassis. The cylinder 175 has a piston rod 177 which is secured to a yoke member 178 that supports a pulley or sheave 182 for rotation. A flexible stainless steel cable 184 extends around the pulley 182 and has one end secured to the cross plate 174. The opposite end portion of the cable 184 wraps around the spool 162, and the end of the cable is rigidly secured to the spool.

As apparent from FIG. 10, when it is desired to raise the crank arms 148 to lower the vehicle or trailer, the hydraulic cylinder 175 is actuated to retract the piston rod 177 so that the axle tube 122 rotates and an additional portion of the cable 184 wraps on the spool 162, as a result of the load carried by the arms 148. When it is desired to raise the vehicle or trailer, the hydraulic cylinder 175 is actuated to extend the piston rod 177 so that the pulley 182 pulls on the cable 184 and rotates the axle tube 122 in a direction to rotate the crank arms 148 downwardly, thereby elevating the vehicle or trailer.

From the drawings and the above description, it is apparent that a multiple stage torsion axle constructed in accordance with the present invention, provides desirable features and advantages. For example, the axle is ideally suited for trailers, wagons or other vehicles which are transported along a road or highway sometimes empty and sometimes fully loaded and which have a substantial difference between a static load and a gross load. When the vehicle is transported empty or at its static load, the first stage shafts 22, 72 or 135 and their associated resilient rods 26, 138 or rod sections 64 and surrounding metal tube sections 16, 74, 94 or 124 provide the desired torsional resistance to the crank arms 52 or 148. When the vehicle is transported loaded or at its gross load, the second stage torsional shafts 48 or 145 and associated rods 36 or sections 64 and tubes 32 or 144 provide the additional torsional resistance to the crank arms 52 so that the vehicle has a smooth ride without bouncing and swaying under all load conditions. In addition, each of the stages of the torsion axle may be easily adjusted to accommodate the static and gross loads of a particular vehicle simply by adjusting the lengths of the resilient or rubber rods 26 or 138 for the first stage and the rods 36 for the second stage.

When it is desired for both crank arms 52 to move together during the first stage, for example, when a horse trailer is being loaded from one side, the first stage shafts may be connected or formed as one shaft, as shown in FIGS. 6 and 11. As another feature, when it is desired to lower the trailer to provide for more convenient loading, the common first stage shaft 72 or the axle tube 122 may be pre-rotated, for example, through an angle of 15 to 20 degrees, by use of the spool 104 or 162 and cable 106 or 184 and hydraulic cylinder 175 or a winch mounted on the tow bar of the trailer. The position of the arms 148 may also be sensed by a detector which operates the cylinder 175 to maintain the arms generally horizontally during use of the vehicle for obtaining optimum performance of the torsion axle 120. A further feature is provided by using the nylon bearings 51 on the ends of the first stage torsion shaft to provide for precisely positioning the axles 56 according to the desired toe-in and camber.

While the forms of multiple stage torsion axle herein described constitute preferred embodiments of the invention, it is to be understood that the invention is not limited to these precise forms, and that changes may be made therein without departing from the scope and spirit of the invention as defined in the appended claims.

The invention having thus been described, the following is claimed:

1. A multiple stage torsion axle adapted for use on a trailer or other vehicle, comprising an elongated axle tube having a longitudinal axis, means for mounting said axle tube on the vehicle for rotation of said axle tube on said axis, means for rotating said axle tube, a first stage torsion shaft and a second stage torsion shaft disposed within said axle tube, first stage torsion means including a resilient rubber-like material and connected for torsionally resisting rotation of said first stage torsion shaft relative to said axle tube, second stage torsion means including a resilient rubber-like material and connected for torsionally resisting rotation of said second stage torsion shaft relative to said first stage torsion shaft, and a crank arm connected to said second stage torsion shaft and having eccentric means for attaching a wheel.

2. A torsion axle as defined in claim 1 and including means for stopping rotation of said first stage torsion shaft relative to said axle tube after a predetermined rotation of said first stage torsion shaft.

3. A torsion axle as defined in claim 1 wherein said first and second stage torsion shafts are axially aligned within said axle tube.

4. A torsion axle as defined in claim 1 wherein said means for rotating said axle tube comprise a hydraulic cylinder, a flexible tension member wrapped at least partially around said axle tube, and means for pulling on said tension member in response to actuation of said cylinder.

5. A torsion axle as defined in claim 1 wherein said second stage torsion means comprise a non-cylindrical metal tube section within said axle tube, and a plurality of resilient rubber-like rods disposed between said metal tube section and said second stage torsion shaft.

6. A torsion axle as defined in claim 1 wherein said axle tube encloses a pair of said second stage torsion shafts and a pair of said second stage torsion means, and a pair of said crank arms connected to said second stage torsion shafts for receiving a pair of the wheels.

7. A torsion axle as defined in claim 1 wherein said axle tube includes a non-circular section surrounding said first stage torsion shaft.

8. A torsion axle as defined in claim 1 wherein said axle tube encloses a pair of said first stage torsion shafts rigidly connected for common rotation, and said first stage torsion means torsionally resist common rotation of said first stage torsion shafts.

9. A torsion axle as defined in claim 8 wherein said means for rotating said axle tube also rotate said first stage torsion shafts as a unit to provide for raising and lowering the wheels and the vehicle to facilitate loading and unloading the vehicle.

10. A torsion axle as defined in claim 1 wherein said mounting means include generally cylindrical bearings supporting said axle tube for rotation.

11. A multiple stage torsion axle adapted for use on a trailer or other vehicle, comprising an elongated axle tube having a center axis, means for mounting on the vehicle and supporting said axle tube for rotation on a longitudinal axis, a first stage torsion shaft and a second stage torsion shaft disposed within said axle tube in axial alignment, a rigid torsion tube section and a plurality of rubber-like resilient rods confining each of said shafts with said rods disposed between said shaft and said torsion tube section for torsionally resisting rotation of said shaft relative to said torsion tube section, said axle tube forming said torsion tube section confining said first stage torsion shaft, means for connecting said torsion tube section confining said second stage torsion shaft to said first stage torsion shaft, and a crank arm connected to said second stage torsion shaft and having eccentric means for attaching a wheel.

12. A torsion axle as defined in claim 11 and including means for stopping rotation of said first stage torsion shaft relative to said axle tube after a predetermined rotation of said first stage torsion shaft.

13. A torsion axle as defined in claim 11 wherein said axle tube encloses a pair of said second stage torsion shafts and corresponding said torsion tube sections and resilient rods, and a pair of said crank arms connected to said second stage torsion shafts for receiving a pair of the wheels.

14. A torsion axle as defined in claim 11 wherein a center portion of said axle tube is non-circular in cross-section and forms the corresponding torsion tube section.

15. A torsion axle as defined in claim 11 and including means for rotating said axle tube to provide for raising and lowering the wheels and the vehicle to facilitate loading and unloading of the vehicle.

16. A multiple stage torsion axle adapted for use on a trailer or other vehicle, comprising an elongated axle tube having a longitudinal axis and a non-circular center portion, means for mounting said axle tube on the vehicle, a first stage torsion shaft and a pair of second stage torsion shafts disposed within said axle tube, said first stage torsion shaft within said center portion of said axle tube and said second stage torsion plurality of resilient rubber-like rods disposed between each said torsion shaft and the corresponding said axle tube and said torsion tube sections for torsionally resisting rotation of each said torsion shaft, means for connecting said second stage torsion tube sections to said first stage torsion shaft, and a crank arm connected to each of said second stage torsion shafts and having eccentric means for attaching a wheel.

17. A torsion axle as defined in claim 16 and including means for stopping rotation of said first stage torsion shaft relative to said axle tube after a predetermined rotation of said first stage torsion shaft.

18. A torsion axle as defined in claim 16 wherein said second stage torsion shafts and corresponding torsion tube sections are axially aligned with said center portion of said axle tube.

19. A torsion axle as defined in claim 16 and including means for rotating said axle tube and said first stage torsion shaft as a unit to provide for raising and lowering the wheels and the vehicle.

20. A torsion axle adapted for use on a trailer or other vehicle, comprising an elongated axle tube having a center axis, means for mounting on the vehicle and supporting said axle tube for rotation relative to the vehicle, a torsion shaft disposed within said axle tube, a plurality of rubber-like resilient rods confining said torsion shaft with said rods disposed between said shaft and said axle tube for torsionally resisting rotation of said shaft relative to said axle tube, a crank arm connected to said torsion shaft and having eccentric means for attaching a wheel, and means for rotating said axle tube, torsion shaft, resilient rods and crank arm as a unit for raising and lowering the wheels and the vehicle.

21. A torsion axle as defined in claim 20 wherein said means for rotating said axle tube comprise a hydraulic cylinder, a flexible tension member wrapped at least partially around said axle tube and secured to said tube, and means for pulling on said tension member in response to actuation of said cylinder.

* * * * *